(12) United States Patent
Muraki

(10) Patent No.: US 8,031,454 B2
(45) Date of Patent: Oct. 4, 2011

(54) ELECTRONIC SYSTEM WITH DYNAMIC THERMAL MANAGEMENT

(75) Inventor: Yosuke Muraki, Campbell, CA (US)

(73) Assignees: Sony Corporation, Tokyo (JP); Sony Electronics, Park Ridge, NJ (US)

( * ) Notice: Subject to any disclaimer, the term of this patent is extended or adjusted under 35 U.S.C. 154(b) by 763 days.

(21) Appl. No.: 11/670,341

(22) Filed: Feb. 1, 2007

(65) Prior Publication Data

US 2008/0186674 A1    Aug. 7, 2008

(51) Int. Cl.
*H02K 5/04* (2006.01)
*H05K 7/20* (2006.01)

(52) U.S. Cl. .......... 361/103; 361/702; 361/695

(58) Field of Classification Search .......... 361/103, 361/702, 695
See application file for complete search history.

(56) References Cited

U.S. PATENT DOCUMENTS

| | | | |
|---|---|---|---|
| 5,249,741 A | | 10/1993 | Bistline et al. |
| 5,513,361 A | | 4/1996 | Young |
| 5,583,316 A | * | 12/1996 | Kitahara et al. ............. 174/16.3 |
| 5,639,152 A | * | 6/1997 | Nelson ............................ 353/119 |
| 5,751,121 A | * | 5/1998 | Toyama et al. ............... 315/307 |
| 5,963,887 A | | 10/1999 | Giorgio |
| 5,974,557 A | | 10/1999 | Thomas et al. |
| 6,318,965 B1 | * | 11/2001 | Nair ................................... 417/2 |
| 6,487,668 B2 | | 11/2002 | Thomas et al. |
| 7,075,261 B2 | * | 7/2006 | Burstein ................... 318/400.11 |
| 7,137,015 B2 | * | 11/2006 | Su ................................... 713/300 |
| 7,265,973 B2 | * | 9/2007 | Lanni ............................. 361/695 |
| 7,327,559 B2 | * | 2/2008 | Fox ........................... 361/679.09 |
| 2006/0095796 A1 | | 5/2006 | Chotoku et al. |

FOREIGN PATENT DOCUMENTS

TW    264538    * 10/2006

* cited by examiner

*Primary Examiner* — Rexford Barnie
*Assistant Examiner* — Zeev V Kitov
(74) *Attorney, Agent, or Firm* — Mikio Ishimaru

(57) ABSTRACT

An electronic system is provided including providing a target semiconductor device connected to a system power supply, measuring the system power supply with the control device for a power usage by the target semiconductor device, and controlling a fan with the control device based on the power usage.

20 Claims, 3 Drawing Sheets

ELECTRONIC SYSTEM WITH DYNAMIC THERMAL MANAGEMENT

TECHNICAL FIELD

The present invention relates generally to an electronic system and more particularly to a computer system.

BACKGROUND ART

Modern consumer electronics, such as game consoles, notebook computers, smart phones, personal digital assistants, and location based services devices, as well as enterprise class electronics, such as servers, storage arrays, and routers, are packing more integrated circuits into an ever shrinking physical space with expectations for decreasing cost. Contemporary electronics expose integrated circuits to more demanding and sometimes new environmental conditions, such as cold, heat, and humidity requiring the overall system to provide robust thermal management solutions. Higher performance, more functions, lower power usage, and longer usage of battery power are yet other expectations placed upon contemporary electronics.

As more functions are packed into integrated circuits and more integrated circuits into a package, more heat is generated degrading the performance, the reliability, and the lifetime of the integrated circuits as well as the overall system. Numerous technologies have been developed to meet these new requirements. Some of the research and development strategies focus on the system power supplies, ventilation, and enclosure fans while others focus on the integrated circuit technologies and associated integrated circuit packaging. Other focus on other forms of thermal management solutions, such as heat sinks/slug, heat spreaders, or localized fans directly over the integrated circuit. Yet other solutions may use a combination of solutions.

More specifically, enclosure fans are often used to evacuate warm air from enclosures in which electronic systems are contained. For example, most computer systems include one or more cooling enclosure fans to aid circulating air inside the enclosures and for maintaining the temperature inside the enclosures within an acceptable range. The increased airflow provided by the enclosure fans typically aids in eliminating heat that may otherwise build up and adversely affect system operation. Employing enclosure fans is especially helpful in ensuring proper operation for certain integrated circuits, such as central processing units (CPUs), with relatively high operating temperatures.

Control of fans in a system typically involves a fan control unit executing a fan control algorithm. A fan control algorithm may determine the method for controlling one or more fans that are configured to evacuate warm air from the electronic system. These requirements and functions also apply to localized fans over an integrated circuit.

Fan speed is usually determined by system software looking at the processor status. This needs a lot of effort to optimize (and debug) the operational efficiency of the fan. The processor may utilize a signal conveying to the system its status (busy or idle). If only one bit is used for this signal, only two statuses may be indicated, resulting in problems.

For example, when a processor is busy, such as when performing numerous and lengthy floating point calculations, the fan needs to run fast in order to cool down the processor. Conversely, when the processor is idle, the fan may run at a lower speed or revolution per minute (RPM) or may even be turned off consuming less power and/or increasing the battery life usage of the electronic system.

With current technology, the fan speed is fixed at one or two modes depending on processor's status (idle or busy). Although the processor may consume and throw off different amounts of power/heat depending on how busy it is (e.g. 40W, 60W, or higher), the fan in the busy mode will turn at one speed and use a constant amount of power. This may result in the system using extra power unnecessarily.

Sometimes processor operation will cause more heat than the fan can handle. The inability to remove excessive heat from electronic systems may lead to permanent damage of the system as well as the integrated circuits. The economic impacts may be best illustrated in the following example. As a product goes through various life cycle phases, such as design, design testing, manufacturing pilot runs, production test, and final production, the cost increases by an order of magnitude from one phase to the next phase of the life cycle when a change is required to a major electronic component of the electronic system.

Designing cooling solutions for systems is also a time-consuming process for the thermal design engineer. Typically, a controller card is required to be designed and built for controlling the fan speed and other functionality, such as failure detection and alarm settings. Often times, the design and construction of multiple control cards are required so as to test them in real world applications to obtain the right combination of fans, fan speeds, alarm settings, etc. Multiple iterations of installing sample fans in a system, determining the adequate fan speeds and power required, and testing the fans in the system, for example, are costly and inefficient.

Thus, a need still remains for an electronic system with a dynamic thermal management solution providing lower power consumption, longer battery life operation, lower cost manufacturing, improved yield, and higher reliability for the electronic systems. In view of the ever-increasing need to save costs and improve efficiencies, it is more and more critical that answers be found to these problems.

Solutions to these problems have been long sought but prior developments have not taught or suggested any solutions and, thus, solutions to these problems have long eluded those skilled in the art.

DISCLOSURE OF THE INVENTION

The present invention provides an electronic system including providing a target semiconductor device connected to a system power supply, measuring the system power supply with the control device for a power usage by the target semiconductor device, and controlling a fan with the control device based on the power usage.

Certain embodiments of the invention have other aspects in addition to or in place of those mentioned or obvious from the above. The aspects will become apparent to those skilled in the art from a reading of the following detailed description when taken with reference to the accompanying drawings.

BEST MODE FOR CARRYING OUT THE INVENTION

Figure 1A:
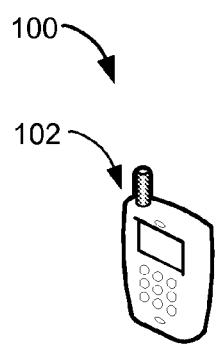
FIGS. 1A, 1B, and 1C are schematic views of examples of electronics systems in which various aspects of the present invention may be implemented.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail. Likewise, the drawings showing embodiments of the system are semi-diagrammatic and not to scale and, particularly, some of the dimensions are for the clarity of presentation and are shown greatly exaggerated in the drawing FIGs. In addition, where multiple embodiments are disclosed and described having some features in common, for clarity and ease of illustration, description, and comprehension thereof, similar and like features one to another will ordinarily be described with like reference numerals.

For expository purposes, the term "horizontal" as used herein is defined as a plane parallel to the plane or surface of the integrated circuit, regardless of its orientation. The term "vertical" refers to a direction perpendicular to the horizontal as just defined. Terms, such as "above", "below", "bottom", "top", "side"(as in "sidewall"), "higher", "lower", "upper", "over", and "under", are defined with respect to the horizontal plane. The term "on" means there is direct contact among elements. The term "system" as used herein means and refers to the method and to the apparatus of the present invention in accordance with the context in which the term is used.

Figure 1B:
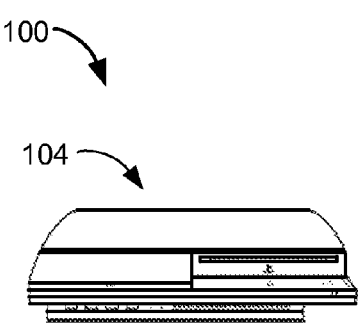
Figure 1C:
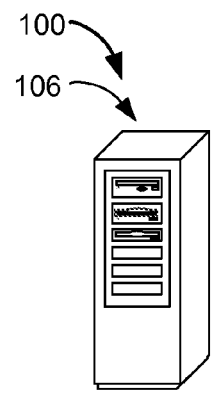

Referring now to FIGS. 1A, 1B, and 1C, therein are shown schematic views of examples of electronics systems 100 in which various embodiments of the present invention may be implemented. A smart phone 102, a game console 104, and a computer system 106 are examples of the electronic systems 100 using the present invention. The electronic systems 100 may perform functions such as the creation, transportation, storage, and consumption of information. For example, the smart phone 102 may create information by transmitting voice to the computer system 106 or consume information by playing a game with the game console 104. The smart phone 102, the game console 104, and the computer system 106 may be used to store the information. The electronic systems 100 may be used to transport information amongst the smart phone 102, the game console 104, and the computer system 106.

Figure 2:
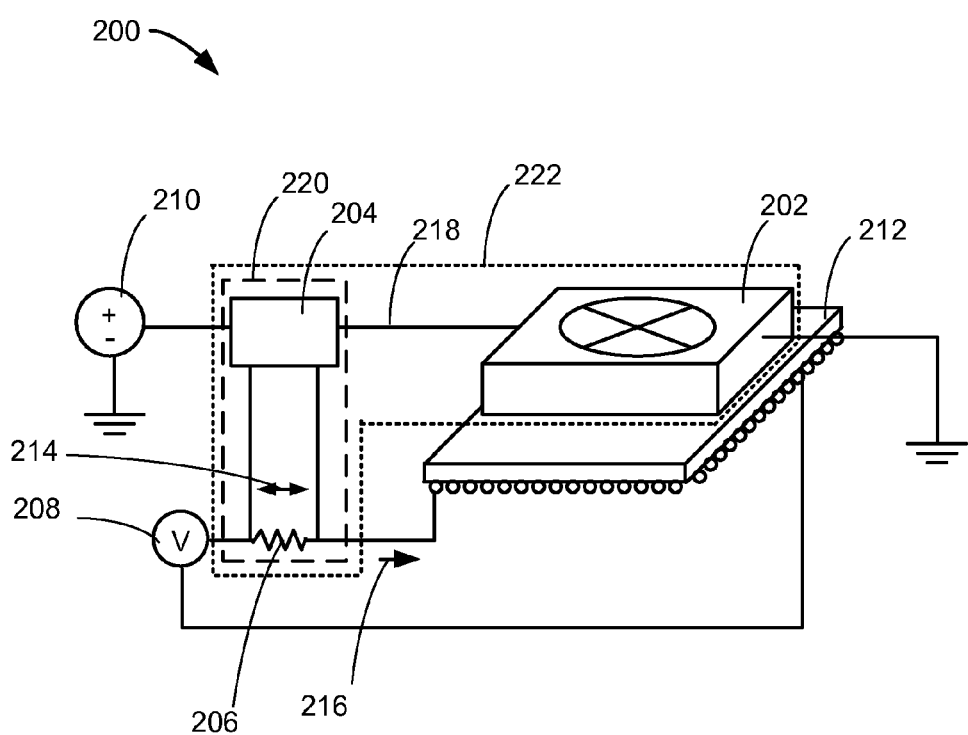
FIG. 2 is a schematic view of a cooling subsystem in an embodiment of the present invention.

Referring now to FIG. 2, therein is shown a schematic view of a cooling subsystem 200 in an embodiment of the present invention. The cooling subsystem 200 may be part of the electronic assembly or electronic subsystem of the electronic systems 100 of FIG. 1. The cooling subsystem 200 includes a fan 202, a control device 204, an electrical usage indicator 206, a system power supply 208, and a fan power supply 210.

The fan 202, such as a fan assembly including a fan housing enclosing a variable speed fan, is over a target semiconductor device 212, such as an integrated circuit device, a microprocessor, a video chip, or a multi-chip package system. The fan 202 has a smaller geometric area than the target semiconductor device 212. The smaller geometric area of the fan 202 allows it to be integrated into densely packaged devices such as the smart phone 102, of FIG.1. The system power supply 208 provides power, such as voltage, current, or both, to the target semiconductor device 212. A measurement 214, such as a voltage drop, across the electrical usage indicator 206, such as a resistor or a variable resistor, provides information about a power usage 216, such as current drawn, by the target semiconductor device 212 from the system power supply 208.

The electrical usage indicator 206 may have a fixed value or may be adjusted to tune the thermal management performance of the cooling subsystem 200. The fan power supply 210 provides power to the control device 204. The control device 204 monitors the power usage 216 and adjusts a fan input 218, such as a voltage or current, to the fan 202 based on the measurement 214 across the electrical usage indicator 206.

For example, as the target semiconductor device 212 gets busier, the power usage 216 by the target semiconductor device 212 also increases. As the power usage 216 increases and the longer the target semiconductor device 212 operates, the more heat the target semiconductor device 212 generates. As the target semiconductor device 212 generates more heat, the fan 202 may operate at higher rotation per minute (RPM) or speed to remove the additional heat. The control device 204 adjusts the speed of the fan 202 in the above example by monitoring the power usage 216 and controlling the fan power supply 210 to the fan input 218 based on the measurement 214. The control device 204 measures the power usage 216 and controls the fan power supply 210 without intervention by the target semiconductor device 212.

The control device 204 may perform the monitoring process in a number of different ways. As an example, the control device 204 may continuously monitor the measurement 214 and dynamically as well as continuously adjust the fan input 218 based on the activity level of the target semiconductor device 212. Alternatively, the control device 204 may periodically or aperiodically but not necessarily continuously monitor the measurement 214 and may periodically or aperiodically adjust the fan input 218.

The control device 204 may control the fan power supply 210 to the fan input 218 in a number of different ways, such as by manipulation or translation of the measurement 214, where the measurement 214 is a measure of the power usage 218 by the target semiconductor device 212. For example, the fan input 218 may be provided with power in a fixed proportion or scalar multiple to the measurement 214. Alternatively, the fan input 218 may be provided with power, which is a tiered or sliding scalar multiplication based on a range of the measurement 214.

As yet another example, the speed of the fan 202 may be increased or decreased by the fan input 218 including a temporal delay based on the specific heat of the target semiconductor device 212, the measurement 214, and a prediction of the measurement 214 based on an activity history of the target semiconductor device 212. Further, the fan input 218 may be change by including an offset that may be fixed or variable based on the range of the measurement 214.

As mentioned above, the electrical usage indicator 206 may be fixed or may be variable. Providing a fixed value for the electrical usage indicator 206 provides a low cost solution where the electronic systems may not operate in significant varying environments, such as temperature, humidity, or air density. The fixed value for the electrical usage indicator 206 may also simplify the operation of the control device 204 for providing a thermal solution.

Alternatively, the electrical usage indicator 206 may be adjusted and set to a predetermined value. The adjustment may stem from the type or expected activity level of the target semiconductor device 212 or the type of the fan 202.

As another example, the cooling subsystem 200 may have a dynamic optimization function where the electrical usage indicator 206 may be adjusted based on thermal performance in actual system environment and usage. The optimization may be in the control device 204, the target semiconductor device 212, or divided into the control device 204 and the target semiconductor device 212.

The control device 204 and the electrical usage indicator 206 may form a control assembly 220. The control assembly 220 may be a plug-in card that may be plugged into the next system level (not shown), such as a printed circuit board or an electronic assembly, with connections for the electrical usage indicator 206, the fan power supply 210, and the fan input 218. The control assembly 220 may offer a modular and pre-tested solution that may be matched to the fan 202 and the needs of the electronic system 100.

The control assembly 220 having the control device 204 and the electrical usage indicator 206 may be integral with the fan 202 forming an intelligent fan 222. The intelligent fan 222 may have connections for the electrical usage indicator 206, the fan power supply 210, and the fan input 218. The intelligent fan 222 may offer an integrated and pre-tested solution having the fan 202 and the necessary electronics.

For illustrative purposes, the system power supply 208 and the fan power supply 210 are shown as separate power sources, although it is understood that the system power supply 208 and the fan power supply 210 may be included in a single power source. Also for illustrative purposes, the cooling subsystem 200 is shown having the fan 202, although it is understood that the cooling subsystem 200 may have more than one fan or be another type of cooling unit. Further for illustrative purposes, the electrical usage indicator 206 is shown as a separate device, although it is understood that the electrical usage indicator 206 may not be separate, such as integral in the control device 204.

Figure 3:
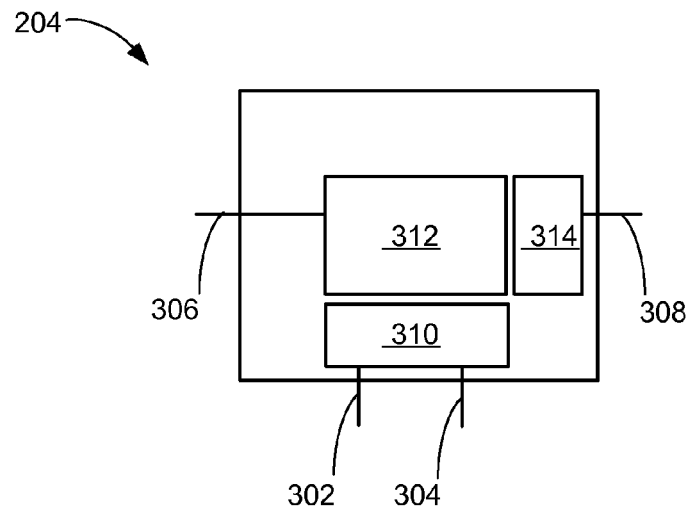
FIG. 3 is a block diagram of the control device of FIG. 2.

Referring now to FIG. 3, therein is shown a block diagram of the control device 204 of FIG. 2. The control device 204 includes a first voltage input 302, a second voltage input 304, a fan supply input 306, and a source output 308. The control device 204 may have other inputs (not shown) and outputs (not shown), such as reset, clock, mode selects, test inputs, and test outputs. The control device 204 also includes a measurement module 310, a translation module 312, and a control module 314. The control device 204 may have other functional modules (not shown), such as a power on reset module or a test module.

The control device 204 measures the power usage 216 of FIG. 2 across the electrical usage indicator 206 of FIG. 2 with the first voltage input 302 and the second voltage input 304. The measurement module 310 samples the measurement 214 of FIG. 2 based on the values on the first voltage input 302 and the second voltage input 304. The translation module 312 generates the fan input 218 of FIG. 2 on the source output 308 based on the fan power supply 210 of FIG. 2 on the fan supply input 306. The control module 314 provides the direction for the monitoring process with the measurement module 310 and the translating process with the translation module 312 as discussed in FIG. 2. The control module 314 directs the monitoring process and the translating process without requiring intervention from the target semiconductor device 212, such as a microprocessor.

The measurement module 310 may be implemented in a number of different ways. For example, the measurement module 310 may be implemented with analog circuitry, such as an operational amplifier comparator. Alternatively, the measurement module 310 may be implemented with digital circuitry, such as an exclusive comparison of the first voltage input 302 and the second voltage input 304. The measurement module 310 may be implemented with a mixed-signal circuitry, such as an analog to digital (ADC) conversion of the first voltage input 302 and the second voltage input 304 with a digital subtraction logic.

The translation module 312 may be implemented in a number of different ways. For example, the translation module 312 may be implemented with analog circuitry, such as a voltage level shifter. Alternatively, the translation module 312 may be implemented with mixed-signal circuitry, which includes digital circuitry, such as pass gates with voltage dividers.

The control module 314 may be implemented in a number of different ways. For example, the control module 314 may be a programmable hardware state machine or a programmable microcontroller. Alternatively, the control module 314 may be implemented for a fixed monitoring and translating process with circuitry that is not programmable or settable.

Figure 4:
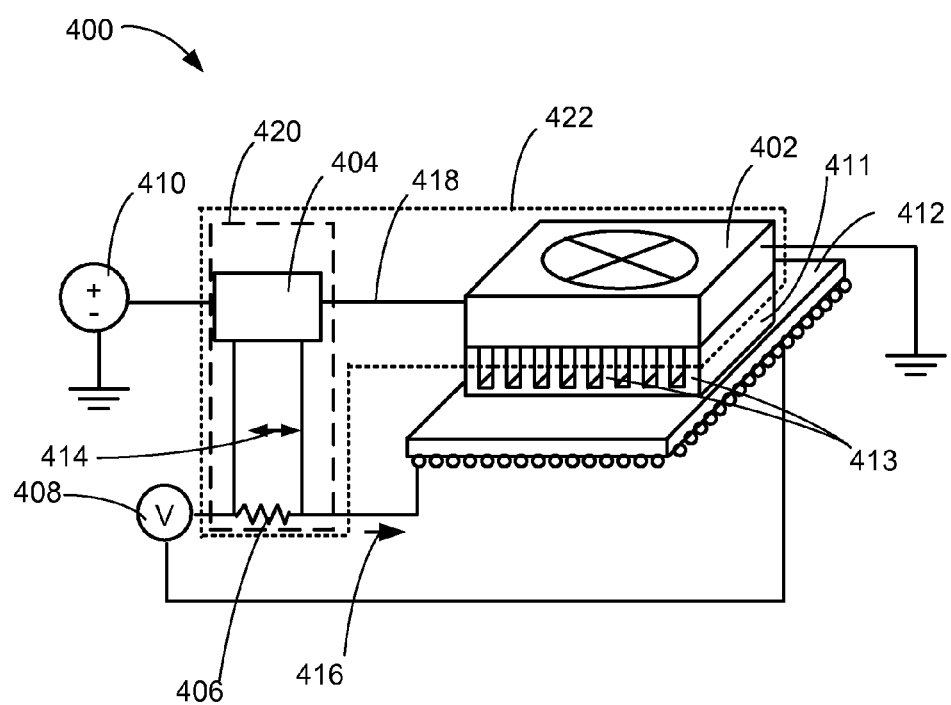
FIG. 4 is a schematic view of a cooling subsystem in an alternative embodiment of the present invention.

Referring now to FIG. 4, therein is shown a schematic view of a cooling subsystem 400 in an alternative embodiment of the present invention. The cooling subsystem 400 is similar to the cooling subsystem 200 of FIG. 2. The cooling subsystem 400 includes a fan 402, a control device 404, an electrical usage indicator 406, a system power supply 408, a fan power supply 410, and a heat spreader 411.

The heat spreader 411 is between a target semiconductor device 412 and the fan 402. As the target semiconductor device 412 generates heat, fins 413 of the heat spreader 411 provide additional surface area to dissipate heat. The fan 402 evacuates the heat from the heat spreader 411 and the target semiconductor device 412. For illustrative purposes, the heat spreader 411 is shown having the fins 413, although it is understood that other heat sinks without the fins 413 may be mounted between the target semiconductor device 412 and the fan 402.

The system power supply 408 provides power to the target semiconductor device 412. A measurement 414 across the electrical usage indicator 406 provides information about a power usage 416, such as a current drawn, by the target semiconductor device 412 from the system power supply 408. The electrical usage indicator 406 may have a fixed value or may be adjusted to tune the thermal management performance of the cooling subsystem 400. The fan power supply 410 provides power to the control device 404. The control device 404 monitors the power usage 416 and adjusts a fan input 418, such as a voltage or current, to the fan 402 based on the measurement 414 across the electrical usage indicator 406.

The system power supply 408 may be similar to the system power supply 208 of FIG. 2. The control device 404 may be similar to the control device 204 of FIG. 2. The electrical usage indicator 406 may be similar to the electrical usage indicator 206 of FIG. 2. The fan power supply 410 may be similar to the fan power supply 210 of FIG. 2.

The control device 404 and the electrical usage indicator 406 may form a control assembly 420. The control assembly 420 may be a plug-in card that may be plugged into the next system level (not shown), such as a printed circuit board or an electronic assembly, with connections for the electrical usage indicator 406, the fan power supply 410, and the fan input 418. The control assembly 420 may offer a modular and pre-tested solution that may be matched to the fan 402 and the needs of the electronic system 100.

The control assembly 420 having the control device 404 and the electrical usage indicator 406 may be integral with the fan 402 and the heat spreader 411 forming an intelligent fan 422. The intelligent fan 422 may have connections for the electrical usage indicator 406, the fan power supply 410, and the fan input 418. The intelligent fan 422 may offer an integrated and pre-tested solution having the fan 402, the heat spreader 411, and the necessary electronics.

Figure 5:
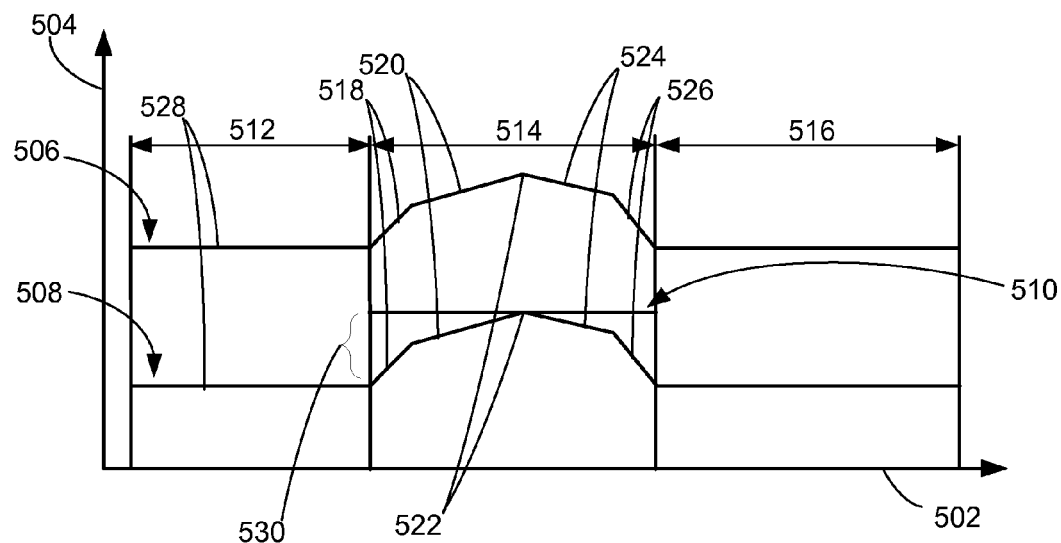
FIG. 5 is a graphical view of the cooling profile of FIG. 2.

Referring now to FIG. 5, therein is shown a graphical view of the cooling profile of FIG. 2. The graphical view depicts a time 502 as the abscissa and a power consumption 504 as the ordinate. A first plot 506 depicts a function for the power consumption 504 of the target semiconductor device 212 of FIG. 2 over the time 502. A second plot 508 depicts a function for the power consumption 504 of the fan 202 of FIG. 2 over the time 502, wherein the second plot 508 depicts the cooling subsystem 200. A third plot 510 depicts a function of the power consumption 504 of the fan 202 over the time 502, wherein the third plot 510 depicts the power consumption 504 of the fan 202 without the embodiment of present invention.

The first plot 506, the second plot 508, and the third plot 510 are shown in a first activity region 512, a second activity region 514, and a third activity region 516 all of which are along the time 502. The first activity region 512 and the third activity region 516 represent idle activity states for the target semiconductor device 212 and the fan 202. The second activity region 514 represents a non-idle or busy activity states for both the target semiconductor device 212 and the fan 202.

In the first activity region 512 and the third activity region 516, the first plot 506, the second plot 508, and the third plot 510 have substantially zero slope or constant value with respect to the power consumption 504. In the idle activity states, the target semiconductor device 212 is not performing operations with large variations that may require large variations of the power usage 216 of FIG. 2 by the target semiconductor device 212. As the target semiconductor device 212 functions in an idle activity state, the fan 202 also depicted operating at a constant speed with substantially constant power consumption.

In the second activity region 514, the first plot 506 has a profile with a first ramp 518, a second ramp 520, a peak 522, a third ramp 524, and a fourth ramp 526. In the second activity region 514, the target semiconductor device 212 operates at an increasing levels as shown by the positive slopes of the first ramp 518 and the second ramp 520 reaching the peak 522 of the power consumption 504. As the target semiconductor device 212 operates at a decreasing level from the peak 522, the power consumption 504 decreases as shown by the negative slopes of the third ramp 524 and the fourth ramp 526.

The second plot 508 in the second activity region 514 depicts the cooling subsystem 200 operating the fan 202 with continuously monitoring the activity of the target semiconductor device 212 and dynamically adjusting the speed of the fan 202 that parallels the activity ramps of the target semiconductor device 212. Within the second activity region 514, the second plot 508 also has the profile with the first ramp 518, the second ramp 520, the peak 522, the third ramp 524, and the fourth ramp 526.

For illustrative purposes, the profile of the first plot 506 and the second plot 508 are shown substantially the same in the second activity region 514, although it is understood that the profile in the second activity region 514 may not be substantially the same for the first plot 506 and the second plot 508. For example, the slopes of the first ramp 518, the second ramp 520, the third ramp 524, and the fourth ramp 526 may not be substantially the same for the first plot 506 and the second plot 508. Instead, the positive or negative slope trends of the first ramp 518, the second ramp 520, the third ramp 524, and the fourth ramp 526 may be the same between the first plot 506 and the second plot 508.

Alternatively, the actual change in the power consumption 504 for the first ramp 518, the second ramp 520, the third ramp 524, and the fourth ramp 526 may not be substantially the same between the first plot 506 and the second plot 508. The graphical view may depict the first plot 506, the second plot 508, and the third plot 510 with a normalization of the power consumption 504 depicting the first ramp 518, the second ramp 520, the third ramp 524 as substantially the same for the first plot 506 and the second plot 508.

Also for illustrative purposes, the first plot 506 and the second plot 508 are shown having substantially the same profile with the second plot 508 offset from the first plot 506 along the power consumption 504, although it is understood that the first plot 506 and the second plot 508 may not have substantially the same profile. For example, the specific heat of the target semiconductor device 212 may have the cooling subsystem 200 operating the fan 202 with a delay or shift along the time 502. This shift results from the cooling subsystem 200 to increase the speed of the fan 202 as the target semiconductor device 212 generates more heat as well as to decrease the speed of the fan 202 as the target semiconductor device 212 is cooled.

The third plot 510 in the second activity region 514 depicts the power consumption 504 of the fan 202 in a conventional cooling system. The third plot 510 has a unit step function increase to the peak 522 and decrease to an idle level 528 at the boundaries of the second activity region 514. Differences 530 between the second plot 508 and the third plot 510 illustrates the power savings of the cooling subsystem 200. This power savings increase usage time under battery power and may simplify other parts of the electronic system 100, such as lower cost of the system power supply 208 of FIG. 2 or lower cost enclosure fans (not shown).

Figure 6:
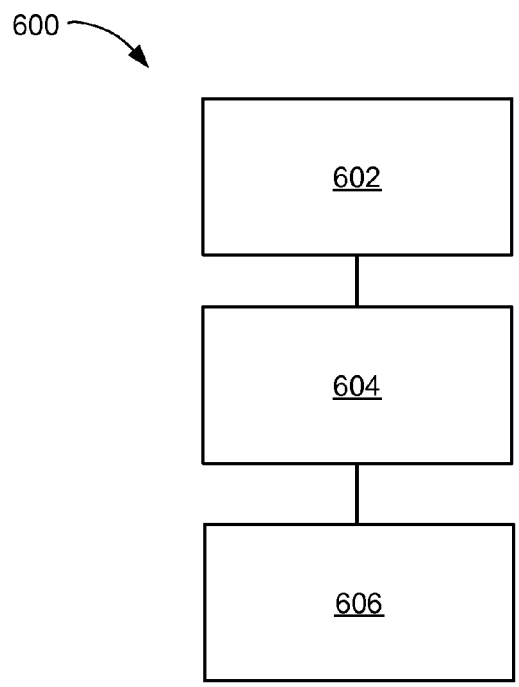
FIG. 6 is a flow chart of an electronic system for manufacture of the electronic system in an embodiment of the present invention.

Referring now to FIG. 6, therein is shown a flow chart of an electronic system 600 for manufacture of the electronic system 100 in an embodiment of the present invention. The system 600 includes providing a target semiconductor device connected to a system power supply in a block 602; measuring the system power supply with the control device for a power usage by the target semiconductor device in a block 604; and controlling a fan with the control device based on the power usage in a block 606.

Yet other important aspects of the embodiments include that it valuably supports and services the historical trend of reducing costs, simplifying systems, and increasing performance.

These and other valuable aspects of the embodiments consequently further the state of the technology to at least the next level.

Thus, it has been discovered that the electronic system of the present invention furnishes important and heretofore unknown and unavailable solutions, capabilities, and functional aspects for improving reliability in systems. The resulting processes and configurations are straightforward, cost-effective, uncomplicated, highly versatile, and effective, can be implemented by adapting known technologies, and are thus readily suited for efficiently and economically manufacturing stackable integrated circuit package system.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operating an electronic system comprising:
   providing a target semiconductor device connected to a system power supply;
   measuring the system power supply with a control device for a power usage by the target semiconductor device; and
   controlling a fan, having a smaller geometric area than the target semiconductor device and mounted over the target semiconductor device, with the control device based on the power usage including connecting a fan power supply, separate from the system power supply, to the control device.

2. The method as claimed in claim 1 wherein measuring the system power supply includes measuring an electrical usage indicator connected to the system power supply with the control device.

3. The method as claimed in claim 1 wherein controlling the fan includes supplying power to a fan input from the control device.

4. The method as claimed in claim 1 further comprising providing a heat spreader between the target semiconductor device and the fan.

5. The method as claimed in claim 1 wherein:
   providing the target semiconductor device includes providing a microprocessor; and
   controlling the fan includes controlling the fan with the control device without intervention of the microprocessor.

6. A method of operating an electronic system comprising:
   providing a target semiconductor device connected to a system power supply;
   providing a control device connected to the system power supply, a fan power supply, and a fan having a smaller geometric area than the target semiconductor device and mounted over the target semiconductor device;
   providing an electrical usage indicator connected to the control device, the system power supply, and the target semiconductor device;
   measuring the electrical usage indicator with the control device for a power usage by the target semiconductor device from the system power supply;
   controlling the fan power supply to a fan input with the control device based on the power usage; and
   controlling the fan, over the target semiconductor device, with the fan input from the control device.

7. The method as claimed in claim 6 wherein measuring the electrical usage indicator with the control device for the power usage by the target semiconductor device includes measuring power across a resistor.

8. The method as claimed in claim 6 wherein measuring the electrical usage indicator with the control device for the power usage by the target semiconductor device includes measuring a current drawn by the target semiconductor device.

9. The method as claimed in claim 6 wherein controlling the fan power supply to the fan input with the control device includes generating the fan input from the control device to the fan.

10. The method as claimed in claim 6 wherein providing the control device includes providing a control assembly having the control device and the electrical usage indicator.

11. An electronic system comprising:
    a system power supply;
    a target semiconductor device connected to the system power supply;
    a fan having a smaller geometric area than the target semiconductor device and mounted over the target semiconductor device; and
    a control device connected to a fan power supply, separate from the system power supply, for controlling a speed of the fan based on a power usage of the system power supply by the target semiconductor device.

12. The system as claimed in claim 11 wherein the control device connected to the fan power supply includes an electrical usage indicator connected to the control device and the system power supply.

13. The system as claimed in claim 11 wherein the control device includes:
    a fan power supply to the control device; and
    a fan input from the control device to the fan.

14. The system as claimed in claim 11 further comprising a heat spreader between the target semiconductor device and the fan.

15. The system as claimed in claim 11 wherein the target semiconductor device includes a microprocessor.

16. The system as claimed in claim 11 wherein:
    the system power supply provides a current;
    the target semiconductor device is a first integrated circuit connected to the system power supply;
    the fan is a variable speed fan mounted over the target semiconductor device;
    the control device is a second integrated circuit connected to the fan power supply for controlling a speed of the fan with the power usage by the target semiconductor device of the system power supply; and
    further comprising:
    an electrical usage indicator connected to the control device, the system power supply, and the target semiconductor device.

17. The system as claimed in claim 16 wherein the electrical usage indicator includes the electrical usage indicator connected between the system power supply and the target semiconductor device.

18. The system as claimed in claim 16 wherein the control device includes:
    a measurement module;
    a control module connected to the measurement module; and
    a translation module connected to the control module.

19. The system as claimed in claim 16 further comprising a control assembly having the electrical usage indicator and the control device thereon.

20. The system as claimed in claim 16 further comprising an intelligent fan having the electrical usage indicator and the control device integral with the fan.

* * * * *